(12) United States Patent
Wang (10) Patent No.: US 11,511,192 B2
(45) Date of Patent: Nov. 29, 2022

(54) INFORMATION PROCESSING METHOD AND APPARATUS IN VIRTUAL REALITY GAME, AND PROCESSOR

(71) Applicant: NETEASE (HANGZHOU) NETWORK CO., LTD., Zhejiang (CN)

(72) Inventor: Yuwen Wang, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 95 days.

(21) Appl. No.: 16/759,372

(22) PCT Filed: Feb. 25, 2019

(86) PCT No.: PCT/CN2019/075996
§ 371 (c)(1),
(2) Date: Apr. 27, 2020

(87) PCT Pub. No.: WO2019/205793
PCT Pub. Date: Oct. 31, 2019

(65) Prior Publication Data
US 2021/0362059 A1    Nov. 25, 2021

(30) Foreign Application Priority Data

Apr. 24, 2018 (CN) .......................... 201810374089.6

(51) Int. Cl.
*A63F 13/58* (2014.01)
*A63F 13/573* (2014.01)
(Continued)

(52) U.S. Cl.
CPC ............ *A63F 13/58* (2014.09); *A63F 13/573* (2014.09); *A63F 13/577* (2014.09); *A63F 13/65* (2014.09); *A63F 2300/8082* (2013.01)

(58) Field of Classification Search
CPC ...... A63F 13/58; A63F 13/573; A63F 13/577; A63F 13/65; A63F 13/211; A63F 13/833;
(Continued)

(56) References Cited

U.S. PATENT DOCUMENTS

| 6,210,273 B1* | 4/2001 | Matsuno | A63F 13/58 463/31 |
| 2017/0266551 A1 | 9/2017 | Baba | |
| 2018/0356880 A1* | 12/2018 | Kashihara | G06F 3/0346 |

FOREIGN PATENT DOCUMENTS

| CN | 105396287 A | 3/2016 |
| CN | 105727551 A | 7/2016 |

(Continued)

OTHER PUBLICATIONS

Dumplingpro <A Fantasy About VR Game Cold Weapon Hurt Counting> Mar. 5, 2018; p. 1-9; <Game and Comic-con Forum>.

*Primary Examiner* — James S. McClellan
*Assistant Examiner* — Ross A Williams
(74) *Attorney, Agent, or Firm* — Gang Yu (57) ABSTRACT

An information processing method and apparatus in a Virtual Reality (VR) game, and a processor are provided. The method includes that: a first move operation of a VR controller in a real environment is acquired; a move of a virtual object in a VR game scene is controlled according to the first move operation, and a calculation factor is calculated according to the first move operation; and when the move of the virtual object in the VR game scene satisfies a preset attack damage trigger condition, damage to an attack target in the VR game scene is calculated according to the calculation factor. The present disclosure solves technical problems in the related art that an operation mode of swinging a weapon to launch an attack in a VR game scene
(Continued)

is easy to cause fatigue of a game player and a calculation mode of damage lacks accuracy.

18 Claims, 2 Drawing Sheets

(51) Int. Cl.
    *A63F 13/577*      (2014.01)
    *A63F 13/65*      (2014.01)

(58) Field of Classification Search
    CPC .... A63F 13/837; A63F 13/245; A63F 13/428; A63F 13/212; A63F 13/42; A63F 13/55; A63F 13/822; A63F 2300/8082; A63F 2300/807
    See application file for complete search history.

(56) References Cited

FOREIGN PATENT DOCUMENTS

| | | |
|---|---|---|
| CN | 106302679 A | 1/2017 |
| CN | 107198879 A | 9/2017 |
| CN | 107638692 A | 1/2018 |
| CN | 107765986 A | 3/2018 |
| CN | 108525296 A | 9/2018 |
| JP | 2010125069 A | 6/2010 |

\* cited by examiner

INFORMATION PROCESSING METHOD AND APPARATUS IN VIRTUAL REALITY GAME, AND PROCESSOR

CROSS-REFERENCE TO RELATED APPLICATIONS

The present disclosure claims benefit of China Patent Application No. 201810374089.6, filed on Apr. 24, 2018, contents of which are hereby incorporated by reference in its entirety.

TECHNICAL FIELD

The present disclosure relates to the field of computers, and in particular to an information processing method and apparatus in a Virtual Reality (VR) game, and a processor.

BACKGROUND

In a VR game, a VR controller worn by a game player may be equivalent to a weapon grip portion (e.g., a hilt) used in the VR game. For example, the game player swinging a handheld VR controller is equivalent to swinging a weapon (e.g., a sword) in the VR game. When the weapon hits an attack target, the attack target is injured according to an operation of the weapon. In this way, an experience of launching an attack by swinging the weapon in the real world will be restored as much as possible.

Thus, the following two design solutions are provided in the related art.

In the first solution, when the game player swings a weapon to hit an attack target, a degree of damage depends on a speed of the game player swings the weapon. That is, the greater the speed, the greater the damage caused.

In the second solution, as long as the weapon held by the game player collides with the attack target, regardless of the speed of swinging the weapon, the weapon will cause a fixed damage to the attack target.

SUMMARY

At least some embodiments of the present disclosure provide an information processing method and apparatus in a VR game and a processor, so at least to partially solve technical problems in the related art that an operation mode of swinging a weapon to launch an attack in a VR game scene is easy to cause fatigue of a game player and a calculation mode of damage lacks accuracy.

In an embodiment of the present disclosure, an information processing method in a VR game is provided, which may include the following steps.

A first move operation of a VR controller in a real environment is acquired; a move of a virtual object in a VR game scene is controlled according to the first move operation, and a calculation factor is calculated according to the first move operation; and when the movement of the virtual object in the VR game scene satisfies a preset attack damage trigger condition, damage to an attack target in the VR game scene is calculated according to the calculation factor.

Optionally, the first move operation may include at least one of the following: a first control operation and a second control operation. The operation that the calculation factor is calculated according to the first move operation may include that: a speed of the first move operation is acquired in real time; when the speed is greater than a first preset threshold, the first control operation is performed, a first duration of the first control operation is recorded, and a calculation factor corresponding to the first control operation is determined, and the calculation factor corresponding to the first control operation is positively correlated to the first duration; and when the speed is smaller than the first preset threshold, the second control operation is performed, a second duration of the second control operation is recorded, and a calculation factor corresponding to the second control operation is determined, and the calculation factor corresponding to the second control operation is negatively correlated to the second duration.

Optionally, when a value calculated by the calculation factor corresponding to the first control operation increases to a preset maximum value, the value may be maintained at the preset maximum value.

Optionally, the operation that the damage to the attack target in the VR game scene is calculated according to the calculation factor may include that: the calculation factor corresponding to the first move operation is calculated according to the calculation factor corresponding to the first control operation and the calculation factor corresponding to the second control operation; and the damage corresponding to the calculated calculation factor is acquired.

Optionally, after the damage to the attack target in the VR game scene is calculated according to the calculation factor, the method may further include one of the following: a trajectory of the first move operation is acquired and converted to a corresponding trajectory in the VR game scene, and when detecting that the corresponding trajectory in the VR game scene collides with a model of the attack target, an attack operation to the attack target is triggered and the calculation factor of the virtual object is cleared; and a second move operation after completing the first move operation is acquired, and when an angle between a vector of the first move operation and a vector of the second move operation is greater than a second preset threshold, the calculation factor of the virtual object is cleared.

In another embodiment of the present disclosure, an information processing apparatus in a VR game is also provided, which may include:

an acquisition component, configured to acquire a first move operation of a VR controller in a real environment; a processing component, configured to control a movement of a virtual object in a VR game scene according to the first move operation, and calculate a calculation factor according to the first move operation; and a calculation component, configured to calculate, when the movement of the virtual object in the VR game scene satisfies a preset attack damage trigger condition, damage to an attack target in the VR game scene according to the calculation factor.

Optionally, the first move operation may include at least one of the following: a first control operation and a second control operation. The processing component may include: a first acquisition element, configured to acquire a speed of the first move operation in real time; a first processing element, configured to perform, when the speed is greater than a first preset threshold, the first control operation, record a first duration of the first control operation, and determine a calculation factor corresponding to the first control operation, the calculation factor corresponding to the first control operation being positively correlated to the first duration; and a second processing element, configured to perform, when the speed is smaller than the first preset threshold, the second control operation, record a second duration of the second control operation, and determine a calculation factor corresponding to the second control operation, the calculation factor corresponding to the second control operation being negatively correlated to the second duration.

Optionally, the first processing element may be configured to maintain, when a value calculated by the calculation factor corresponding to the first control operation increases to a preset maximum value, the value at the preset maximum value.

Optionally, the calculation component may include: a calculation element, configured to calculate the calculation factor corresponding to the first move operation according to the calculation factor corresponding to the first control operation and the calculation factor corresponding to the second control operation; and a second acquisition element, configured to acquire the damage corresponding to the calculated calculation factor.

Optionally, the apparatus may further include: a nulling component, configured to acquire a trajectory of the first move operation and convert the trajectory of the first move operation to a corresponding trajectory in the VR game scene, and when detecting that the corresponding trajectory in the VR game scene collides with a model of the attack target, trigger an attack operation to the attack target and clear the calculation factor of the virtual object; or acquire a second move operation after completing the first move operation, and when an angle between a vector of the first move operation and a vector of the second move operation is greater than a second preset threshold, clear the calculation factor of the virtual object.

In another embodiment of the present disclosure, a storage medium is also provided, which may include a stored program, and when the stored program is run, a device where the storage medium is located may be controlled to perform the information processing method in a VR game.

In another embodiment of the present disclosure, a processor is also provided. The processor is configured to run a program, and when the program is run, the information processing method in a VR game is performed.

In another embodiment of the present disclosure, user equipment is also provided. The user equipment may include at least one processor, a memory, and at least one program. The at least one program may be stored in the memory, and configured to be executed by the at least one processor. The at least one processor may be configured to perform the information processing method in a VR game.

In at least some embodiments of the present disclosure, the first move operation of the VR controller in the real environment is acquired; the movement of the virtual object in the VR game scene is controlled according to the first move operation, and the calculation factor is calculated according to the first move operation; and when the movement of the virtual object in the VR game scene satisfies the preset attack damage trigger condition, the damage to the attack target in the VR game scene is calculated according to the calculation factor. The purpose of reducing actual slashing experience as much as possible without causing fatigue to game players is achieved, and further achieving technical effects of enhancing the realism of slashing the weapon to launch an attack in the VR game scene, and improving a calculation accuracy of the damage caused by slashing the weapon and launching the attack. Thus, the technical problems in the related art that the operation mode of swinging the weapon to launch the attack in the VR game scene is easy to cause the fatigue of the game player and the calculation mode of the damage lacks accuracy are solved.

BRIEF DESCRIPTION OF THE DRAWINGS

The accompanying drawings described herein are used for providing a further understanding of the present disclosure, and constitute a part of the present application, and the exemplary embodiments of the present disclosure and the description thereof are used for explaining the present disclosure, but do not constitute improper limitations to the present disclosure. In the drawings.

DETAILED DESCRIPTION

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

As mentioned above, two design solutions are provided in the related art. However, these two design solutions have the following drawbacks.

In the first solution, a drawback of this solution is that the game player has to forcefully slash the controller in order to make a physical attack more harmful in the game, which obviously increases fatigue of the game player.

In the second solution, if a weaker force of contact between the weapon held by a game character controlled by the game player and the attack target may cause damage on the attack target in the game, it will not be match to an actual weapon slashing experience. In addition, the game player may control the game character repeatedly colliding with the attack target by shaking the weapon to a small extent quickly to achieve multiple repeated damages, which may be taken as loopholes in a game design. In order to make an action of slashing the weapon close to the real experience, a game designer hopes that the game player may perform a weapon slashing operation in a normal and complete manner to cause damage to the attack target. If the game player may repeatedly collide with the attack target by shaking the weapon to a small extent quickly, multiple damages to the attack target will be resulted in a short time, which obviously deviates from an original intention of the game designer.

As to above-mentioned problem, no effective solution has been provided yet.

In an embodiment of the present disclosure, an information processing method in a VR game is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

Figure 1:
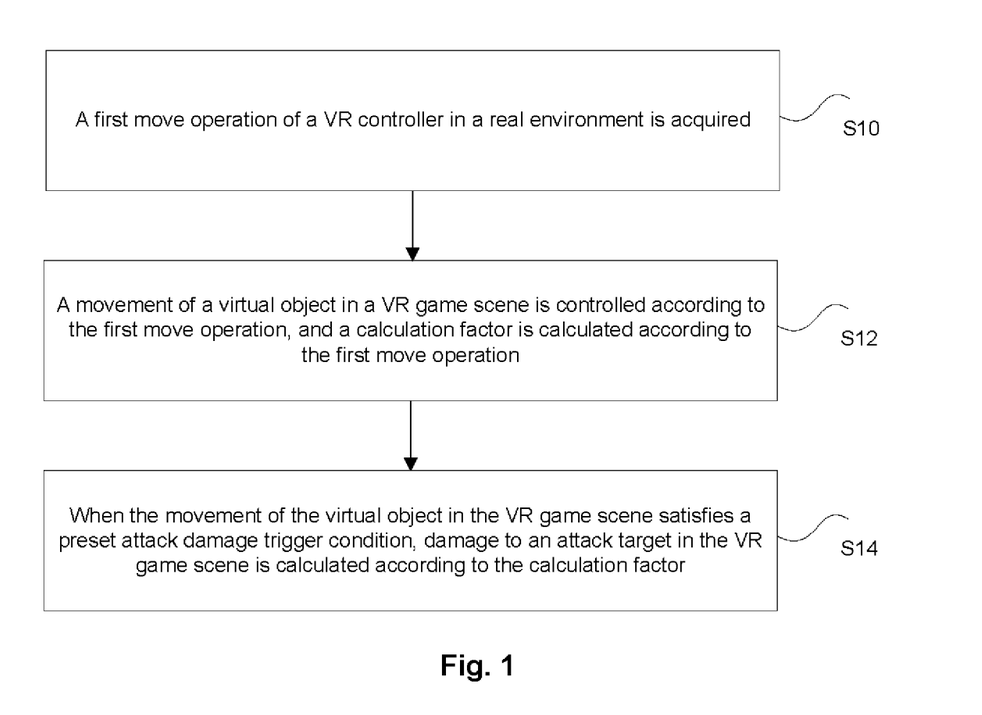
FIG. 1 is a flowchart of an information processing method in a VR game according to an embodiment of the present disclosure.

FIG. 1 is a flowchart of an information processing method in a VR game according to one embodiment of the present disclosure. As shown in FIG. 1, the method includes the following steps.

At step S10, a first move operation of a VR controller in a real environment is acquired.

At step S12, a movement of a virtual object in a VR game scene is controlled according to the first move operation, and a calculation factor is calculated according to the first move operation.

At step S14, when the movement of the virtual object in the VR game scene satisfies a preset attack damage trigger condition, damage to an attack target in the VR game scene is calculated according to the calculation factor.

By means of the above steps, the first move operation of the VR controller in the real environment is acquired; the movement of the virtual object in the VR game scene is controlled according to the first move operation, and the calculation factor is calculated according to the first move operation; and when the movement of the virtual object in the VR game scene satisfies the preset attack damage trigger condition, the damage to the attack target in the VR game scene is calculated according to the calculation factor. The purpose of reducing actual slashing experience as much as possible without causing fatigue to game players is achieved, thus achieving technical effects of enhancing the realism of slashing the weapon to launch an attack in the VR game scene, and improving a calculation accuracy of the damage caused by slashing the weapon and launching the attack. Thus, the technical problems in the related art that the operation mode of swinging the weapon to launch the attack in the VR game scene is easy to cause the fatigue of the game player and the calculation mode of the damage lacks accuracy are solved.

The virtual object may be an attack weapon used by a virtual game character in the VR game scene. The movement of the virtual object in the VR game scene satisfies the preset attack damage trigger condition refers to that an collision between the virtual object and a model of the attack target is detected. That is, the virtual game character swings the attack weapon to the attack target in the game, and the attack weapon contacts the attack target to cause damage to the attack target. The calculation factor is used for acquiring attribute parameters of the virtual object (for example, an energy value, an attack value, etc. of the attack weapon). In the actual calculation process, an energy value of the attack weapon may be obtained by multiplying the calculation factor and a preset value.

Optionally, at step S12, the first move operation includes at least one of the following: a first control operation and a second control operation. The operation that the calculation factor is calculated according to the first move operation may include the following executable steps.

At step S121, a speed of the first move operation is acquired in real time.

At step S122, when the speed is greater than a first preset threshold, the first control operation is performed, a first duration of the first control operation is recorded, and a calculation factor corresponding to the first control operation is determined, and the calculation factor corresponding to the first control operation is positively correlated to the first duration.

At step S123, when the speed is smaller than the first preset threshold, the second control operation is performed, a second duration of the second control operation is recorded, and a calculation factor corresponding to the second control operation is determined, and the calculation factor corresponding to the second control operation is negatively correlated to the second duration.

In a slashing attack operation in the VR game, in order to avoid excessive fatigue caused by an excessively slashing of the game player, the damage caused by the attack may be correlated with at least one of a slashing speed and a slashing distance. The first control operation may be an energy accumulation operation, and the second control operation may be an energy lapse operation.

When the game player is performing to swing a weapon, if the swinging speed reaches an energy accumulation speed value (which is equivalent to the first preset threshold), the weapon is set to start accumulating energy. That is, the energy accumulation operation is performed. For example, when the game player raises his hand in order to control a game character to perform raising the weapon in the game, a position of the weapon is point A. Then, the game player performs a slashing action to make the weapon toward the attack target. A current position of the weapon is point B. If the swinging speed of the slashing action reaches the energy accumulation speed value, a process of weapon swinging from point A to point B will accumulate energy.

If the swinging speed at which the game character controlled by the game player swings the weapon remains at the energy accumulation speed value, or above the energy accumulation speed value, the energy value of the weapon will be accumulated over time. Since the energy value is accumulated according to a time course, the swinging speed remains above the energy accumulation speed value, so that the energy will not be accumulate faster according to a swinging operation at a faster speed by the game character controlled by the game player.

If the swinging speed at which the game character controlled by the game player swings the weapon drops below the energy accumulation speed value, the energy value of the weapon will elapse according to the time course. That is, the energy lapse operation is performed until the energy value is reduced to 0.

The damage to the attack target caused by slashing the weapon is calculated according to the energy value accumulated by the weapon. As long as the swinging speed of the weapon reaches the energy accumulation speed value, the energy value may be accumulated, so the game character controlled by the game player does not need to swing the weapon excessively. In addition, since the speed at which the weapon is swung needs to reach the energy accumulation speed value to start energy accumulation, the game character controlled by the game player holding the weapon and gently touching the attack target does not cause any damage.

Optionally, at step S122, when a value calculated by the calculation factor corresponding to the first control operation increases to a preset maximum value, the value is maintained at the preset maximum value.

For weapons, there is a maximum energy value which can be taken as one of attributes of virtual tool in the game, and when the energy value reaches the maximum energy value, the energy value will not continue to accumulate. For different types of weapons, different maximum energy values may be set separately. For example, compared with light weapons (such as daggers or darts), heavy weapons (such as a green dragon crescent blade, or a Chinese halberd) will set a higher maximum energy value to cause higher damage to the attack target.

Since the energy value is accumulated with the time course, before the maximum energy value is reached, the longer the swing time period, the greater the accumulated energy value, and the higher the damage to the attack target. This setting is consistent with the real slashing experience.

Optionally, at step S14, the operation that the damage to the attack target in the VR game scene is calculated according to the calculation factor may include the following executable steps.

At step S141, the calculation factor corresponding to the first move operation is calculated according to the calculation factor corresponding to the first control operation and the calculation factor corresponding to the second control operation.

At step S142, the damage corresponding to the calculated calculation factor is acquired.

By comprehensively analyzing the energy accumulation situation or the energy lapse corresponding to at least one energy accumulation operation and/or at least one energy lapse operation contained in the first move operation in each movement, a calculation factor corresponding to each movement is calculated respectively, thus calculating a total energy value corresponding to the first move operation. Then, through a corresponding relationship pre-established between the energy value accumulated in the weapon and the damage to the attack target, when the weapon hits the attack target, if the energy value accumulated by the weapon is higher, the damage is higher.

Optionally, after the damage to the attack target in the VR game scene is calculated according to the calculation factor at step S14, the method may further include the following executable steps.

At step S15, a trajectory of the first move operation is acquired and converted to a corresponding trajectory in the VR game scene, and when detecting that the corresponding trajectory in the VR game scene collides with a model of the attack target, an attack operation to the attack target is triggered and the calculation factor of the virtual object is cleared; and a second move operation after completing the first move operation is acquired, and when an angle between a vector of the first move operation and a vector of the second move operation is greater than a second preset threshold, the calculation factor of the virtual object is cleared.

The energy value of the weapon is directly cleared when:
(1) the weapon hits the attack target;
(2) a direction in which the weapon is swung suddenly changes excessively (for example: ≥120 degrees, which is equivalent to the second preset threshold). For example, the previous action of the game character controlled by the game player is to swing leftwards (equivalent to the first move operation), and the next action is to swing rightwards (equivalent to the second move operation). Considering that the direction of adjacent weapon swinging is quite different, an original intention of a game design is that energy accumulated by the previous swinging (leftward) is not intended to drive the subsequent swinging (rightward), which is inconsistent with the real experience. In addition, the above 120 degrees is an empirical value obtained through trial and error, and this degree may also be flexibly adjusted according to actual needs of the game.

Since the energy value of the weapon is automatically cleared when the weapon hits the attack target, if it is desired to cause damage to the attack target again, it is necessary to perform a slashing action once again. This setting is consistent with the real slashing experience.

Based on the above analysis, due to introduction of an energy value accumulation mechanism, an energy value lapse mechanism and an energy value nulling mechanism, the game character controlled by the game player quickly and shortly swings the weapon multiple times to collide with the attack target, which does not cause damage to the attack target or causes a small amount of damage. This setting is consistent with the slashing experience of an actual operation, while also avoiding some cheating techniques, such as, quickly swinging weapons multiple times to collide with the attack target to cause high damage.

Figure 2:
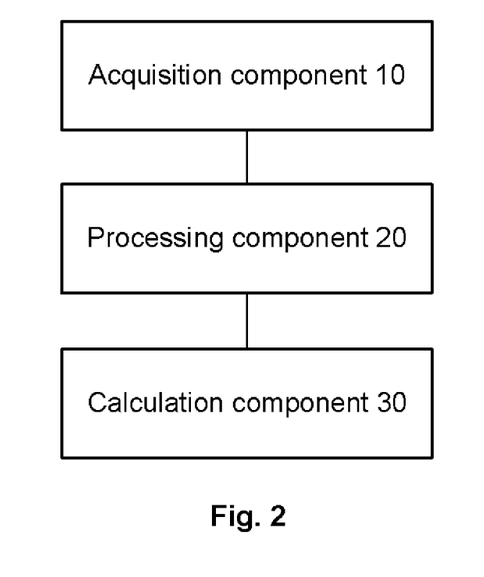
FIG. 2 is a structural block diagram of an information processing apparatus in a VR game according to an embodiment of the present disclosure.

In another embodiment of the present disclosure, an information processing apparatus in a VR game is provided. FIG. 2 is a structural block diagram of an information processing apparatus in a VR game according to an embodiment of the present disclosure. As shown in FIG. 2, the apparatus includes: an acquisition component 10, configured to acquire a first move operation of a VR controller in a real environment; a processing component 20, configured to control a movement of a virtual object in a VR game scene according to the first move operation, and calculate a calculation factor according to the first move operation; and a calculation component 30, configured to calculate, when the movement of the virtual object in the VR game scene satisfies a preset attack damage trigger condition, damage to an attack target in the VR game scene according to the calculation factor.

Optionally, the first move operation includes at least one of the following: a first control operation and a second control operation. The processing component 20 includes: a first acquisition element (not shown in the figure), configured to acquire a speed of the first move operation in real time; a first processing element (not shown in the figure), configured to perform, when the speed is greater than a first preset threshold, the first control operation, record a first duration of the first control operation, and determine a calculation factor corresponding to the first control operation, the calculation factor corresponding to the first control operation being positively correlated to the first duration; and a second processing element (not shown in the figure), configured to perform, when the speed is smaller than the first preset threshold, the second control operation, record a second duration of the second control operation, and determine a calculation factor corresponding to the second control operation, the calculation factor corresponding to the second control operation being negatively correlated to the second duration.

Optionally, the first processing element (not shown in the figure) is configured to maintain, when a value calculated by the calculation factor corresponding to the first control operation increases to a preset maximum value, the value at the preset maximum value.

Optionally, the calculation component 30 includes: a calculation element (not shown in the figure), configured to calculate the calculation factor corresponding to the first move operation according to the calculation factor corresponding to the first control operation and the calculation factor corresponding to the second control operation; and a second acquisition element (not shown in the figure), configured to acquire the damage corresponding to the calculated calculation factor.

Figure 3:
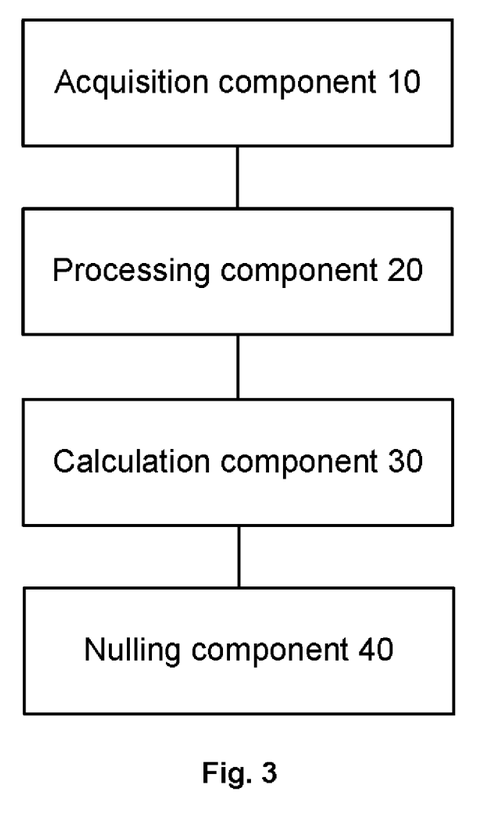
FIG. 3 is a structural block diagram of an information processing apparatus in a VR game according to an optional embodiment of the present disclosure.

Optionally, FIG. 3 is a structural block diagram of an information processing apparatus in a VR game according to an optional embodiment of the present disclosure. As shown in FIG. 3, the apparatus further includes: a nulling component 40, configured to acquire a trajectory of the first move operation and convert the trajectory of the first move operation to a corresponding trajectory in the VR game scene, and when detecting that the corresponding trajectory in the VR game scene collides with a model of the attack target, trigger an attack operation to the attack target and clear the calculation factor of the virtual object; or acquire a second move operation after completing the first move operation, and when an angle between a vector of the first move operation and a vector of the second move operation is greater than a second preset threshold, clear the calculation factor of the virtual object.

In another embodiment of the present disclosure, a storage medium is also provided, which includes a stored program. When the stored program is run, a device where the storage medium is located is controlled to perform the information processing method in a VR game. The storage medium may include, but is not limited to, various media capable of storing a program code such as a U disk, a Read-Only Memory (ROM), a Random Access Memory (RAM), a mobile hard disk, a magnetic disk or an optical disc.

In another embodiment of the present disclosure, a processor is also provided. The processor is configured to run a program. When the program is run, the information processing method in a VR game is performed. The processor may include but is not limited to any processing device such as a Micro Controller Unit (MCU) or a Field Programmable Gate Array (FPGA).

In another embodiment of the present disclosure, user equipment is also provided. The user equipment includes at least one processor, a memory, and at least one program. The at least one program is stored in the memory, and configured to be executed by the at least one processor. The at least one processor is configured to perform the information processing method in a VR game. In some embodiments, the user equipment may be a terminal device such as a smart phone (for example, an Android phone, an iOS phone, etc.), a tablet computer, a palm computer, a Mobile Internet Device (MID), a PAD, a VR controller, a head-mounted display device, etc. The user equipment may further include a display apparatus. The display apparatus may be a Liquid Crystal Display (LCD) through which a user can interact with a user interface of the user equipment. In addition, the user equipment may further includes at least one of the following: an input/output interface (I/O interface), a Universal Serial Bus (USB) port, a network interface, a power supply and a camera.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into a processing element, each element may also physically exist independently, and two or more than two elements may also be integrated into an element. The integrated element may be implemented in a hardware form and may also be implemented in form of software functional element.

The integrated element may be stored in a computer-readable storage medium if being implemented in the form of a software functional element and sold or used as a standalone product. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. An information processing method in a Virtual Reality (VR) game, comprising:
   acquiring a first move operation of a VR controller in a real environment;
   controlling a movement of a virtual object in a VR game scene according to the first move operation, and calculating a calculation factor according to the first move operation; and
   when the movement of the virtual object in the VR game scene satisfies a preset attack damage trigger condition, calculating, according to the calculation factor, damage to an attack target in the VR game scene;
   wherein the first move operation comprises at least one of the following: a first control operation and a second control operation; and
   wherein calculating the calculation factor according to the first move operation comprises:
   acquiring a speed of the first move operation in real time,
   when the speed is greater than a first preset threshold, performing the first control operation, recording a first duration of the first control operation, and determining a calculation factor corresponding to the first control operation, the calculation factor corresponding to the first control operation being positively correlated to the first duration, and when the speed is smaller than the first preset threshold, performing the second control operation, recording a second duration of the second control operation, and determining a calculation factor corresponding to the second control operation, the calculation factor corresponding to the second control operation being negatively correlated to the second duration.

2. The method as claimed in claim 1, wherein when a value calculated by the calculation factor corresponding to the first control operation increases to a preset maximum value, the value is maintained at the preset maximum value.

3. The method as claimed in claim 2, wherein for different types of virtual objects, different maximum energy values are set separately.

4. The method as claimed in claim 1, wherein calculating, according to the calculation factor, the damage to the attack target in the VR game scene comprises:

calculating the calculation factor corresponding to the first move operation according to the calculation factor corresponding to the first control operation and the calculation factor corresponding to the second control operation; and acquiring the damage corresponding to the calculated calculation factor.

5. The method as claimed in claim 4, wherein after calculating, according to the calculation factor, the damage to the attack target in the VR game scene, the method further comprises one of the following:

acquiring a trajectory of the first move operation and converting the trajectory of the first move operation to a corresponding trajectory in the VR game scene, and when detecting that the corresponding trajectory in the VR game scene collides with a model of the attack target, triggering an attack operation to the attack target and nulling the calculation factor of the virtual object; and acquiring a second move operation after completing the first move operation, and when an angle between a vector of the first move operation and a vector of the second move operation is greater than a second preset threshold, nulling the calculation factor of the virtual object.

6. The method as claimed in claim 1, wherein the virtual object is an attack weapon used by a virtual game character in the VR game scene.

7. The method as claimed in claim 1, wherein an expression of the movement of the virtual object in the VR game scene satisfies the preset attack damage trigger condition refers to that the virtual object collides with a model of the attack target.

8. The method as claimed in claim 1, wherein the calculation factor is used for acquiring at least one attribute parameter of the virtual object.

9. The method as claimed in claim 1, wherein the at least one attribute parameter comprises: an energy value, the energy value is obtained by multiplying the calculation factor and a preset value.

10. The method as claimed in claim 1, wherein the damage to the attack target is correlated with at least one of a slashing speed and a slashing distance of the first move operation.

11. The method as claimed in claim 1, wherein the first control operation is an energy accumulation operation, and the second control operation is an energy lapse operation.

12. An electronic device in a Virtual Reality (VR) game, comprising: a hardware processor coupled with a memory and configured to execute program components stored on the memory, wherein the program components comprise:

an acquisition component, configured to acquire a first move operation of a VR controller in a real environment;

a processing component, configured to control a movement of a virtual object in a VR game scene according to the first move operation, and calculate a calculation factor according to the first move operation; and a calculation component, configured to calculate, when the movement of the virtual object in the VR game scene satisfies a preset attack damage trigger condition, damage to an attack target in the VR game scene according to the calculation factor;

wherein the first move operation comprises at least one of the following: a first control operation and a second control operation, and the processing component comprises: a first acquisition element, configured to acquire a speed of the first move operation in real time; a first processing element, configured to perform, when the speed is greater than a first preset threshold, the first control operation, record a first duration of the first control operation, and determine a calculation factor corresponding to the first control operation, the calculation factor corresponding to the first control operation being positively correlated to the first duration; and a second processing element, configured to perform, when the speed is smaller than the first preset threshold, the second control operation, record a second duration of the second control operation, and determine a calculation factor corresponding to the second control operation, the calculation factor corresponding to the second control operation being negatively correlated to the second duration.

13. The apparatus as claimed in claim 12, wherein the first processing element is configured to maintain, when a value calculated by the calculation factor corresponding to the first control operation increases to a preset maximum value, the value at the preset maximum value.

14. The apparatus as claimed in claim 12, wherein the calculation component comprises:

a calculation element, configured to calculate the calculation factor corresponding to the first move operation according to the calculation factor corresponding to the first control operation and the calculation factor corresponding to the second control operation; and a second acquisition element, configured to acquire the damage corresponding to the calculated calculation factor.

15. The apparatus as claimed in claim 14, wherein the program components further comprise:

a nulling component, configured to acquire a trajectory of the first move operation and convert the trajectory of the first move operation to a corresponding trajectory in the VR game scene, and when detecting that the corresponding trajectory in the VR game scene collides with a model of the attack target, trigger an attack operation to the attack target and clear the calculation factor of the virtual object; or acquire a second move operation after completing the first move operation, and when an angle between a vector of the first move operation and a vector of the second move operation is greater than a second preset threshold, clear the calculation factor of the virtual object.

16. A non-transitory storage medium, comprising a stored program, wherein when the stored program is run, a device where the storage medium is located is controlled to perform the information processing method in a Virtual Reality (VR) game as claimed in claim 1.

17. A processor, configured to run a program, wherein the program is run to perform the information processing method in a Virtual Reality (VR) game as claimed in claim 1.

18. A user equipment, comprising: at least one processor, a memory, and at least one program, wherein the at least one program is stored in the memory, and configured to be run by the at least one processor, the at least one program being configured to perform the information processing method in a Virtual Reality (VR) game as claimed in claim 1.

* * * * *